(12) United States Patent
Gasbarro (10) Patent No.: US 7,662,031 B1
(45) Date of Patent: Feb. 16, 2010

(54) TURKEY BREAST DEFATTER

(75) Inventor: Geno N. Gasbarro, Columbus, OH (US)

(73) Assignee: Remington Holdings LLC, Columbus, OH (US)

(*) Notice: Subject to any disclaimer, the term of this patent is extended or adjusted under 35 U.S.C. 154(b) by 0 days.

(21) Appl. No.: 12/188,354

(22) Filed: Aug. 8, 2008

(51) Int. Cl.
*A22C 17/12* (2006.01)

(52) U.S. Cl. ...................................... 452/130

(58) Field of Classification Search ............ 452/111, 452/112, 125, 129, 130
See application file for complete search history.

(56) References Cited

U.S. PATENT DOCUMENTS

| | | | | |
|---|---|---|---|---|
| 4,010,515 A | * | 3/1977 | Koyama | 452/127 |
| 5,186,680 A | * | 2/1993 | Conaway et al. | 452/125 |
| 6,213,863 B1 | * | 4/2001 | Basile et al. | 452/127 |
| 6,264,542 B1 | * | 7/2001 | Gasbarro | 452/125 |
| 6,579,164 B1 | * | 6/2003 | Groth | 452/125 |

* cited by examiner

*Primary Examiner*—Thomas Price
(74) *Attorney, Agent, or Firm*—Jason H. Foster; Kremblas, Foster, Phillips & Pollick (57) ABSTRACT

An automated poultry defatting apparatus which includes a housing having a product feed inlet and discharge outlet and housing a conveyor aligned to engage the upper surface of a piece of poultry product entering the feed inlet. The apparatus is provided with upper and lower peeling members for engaging the upper and lower surfaces of the poultry product passing between the conveyor and the peeling members. The peeling members have a plurality of grooved rollers that rotate in a cooperative manner to pinch and pull fat off the product while leaving the underlying muscle intact. The conveyor is pivotably mounted to the housing to permit automatic adjustment to a range of sizes of poultry product while maintaining a controlled downward force against the product to maintain firm engagement with the peeling members.

13 Claims, 6 Drawing Sheets

TURKEY BREAST DEFATTER

BACKGROUND OF THE INVENTION

1. Field of the Invention

This invention relates generally to defatting devices and more particularly to a device for removing the fat from sectioned pieces of poultry, such as, for example, turkey breasts.

2. Description of the Related Art

Over the past several decades, the defatting of pieces of poultry product, and turkey breasts in particular, has largely been performed manually, which requires skilled labor. Even with a properly trained workforce, however, the defatting process has historically been associated with the potential for accidental injury, relatively low product yields, a significant labor cost, and a certain level of inconsistency of performance naturally attendant with any manual chore of this type.

It is therefore desirable to have means for efficiently defatting pieces of poultry product, and particularly turkey breasts, for maximizing product yields and consistency while minimizing production costs and the risk of accidental injury.

BRIEF SUMMARY OF THE INVENTION

The present invention relates to an automated poultry defatting apparatus which effectively and efficiently removes the fat from pieces of poultry product in a manner which does not significantly damage or waste the underlying meat portions of the product.

The apparatus of the present invention preferably includes a base, a housing, a feed inlet and discharge outlet, and a defatting station mounted to the base and the housing intermediate the inlet and the outlet. The defatting station preferably includes an endless belt-type conveyor which is mounted to the housing in a vertically movable relationship for both advancing poultry product along the defatting station and applying a controlled pressure on the product against upper, lower, and peripheral peeling members mounted adjacent and below the conveyor. Each peeling member incorporates a plurality of peel rollers that rotate in a cooperative manner to pinch the external fat on the poultry product. Each roller is preferably provided with a plurality of elongated, helical grooves in its outer surface that form "lands" or ridges therebetween that are configured to entrap and efficiently pull the fat away from the rest of the poultry product as the rollers rotate. This combination of structures cooperates to assure that the vast majority of the fat is effectively peeled away from various muscle sections of the product while the underlying meat (muscle) is essentially unaffected, rather than attempting to cut or slice the fat from the underlying meat.

Therefore, it is an aspect of the present invention to provide a poultry defatting apparatus which effectively and efficiently pulls the external fat from the underlying meat portion of the poultry product while avoiding ripping or tearing of the underlying meat of the product.

It is another aspect of the present invention to provide a method of defatting a poultry product wherein the fat of a piece of poultry product is engaged and trapped under a controlled degree of pressure or force to cause the fat to be peeled from the whole piece of poultry product without significant damage to the underlying meat.

It is another aspect of the present invention to provide an apparatus of the type described having the advancing conveyor pivotably mounted to the housing for allowing the forward end of the of the conveyor to automatically adjust to receive the poultry product within a range of different sizes while maintaining a downward force within a selected range on the piece of poultry product against the peeling members.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figure 1:
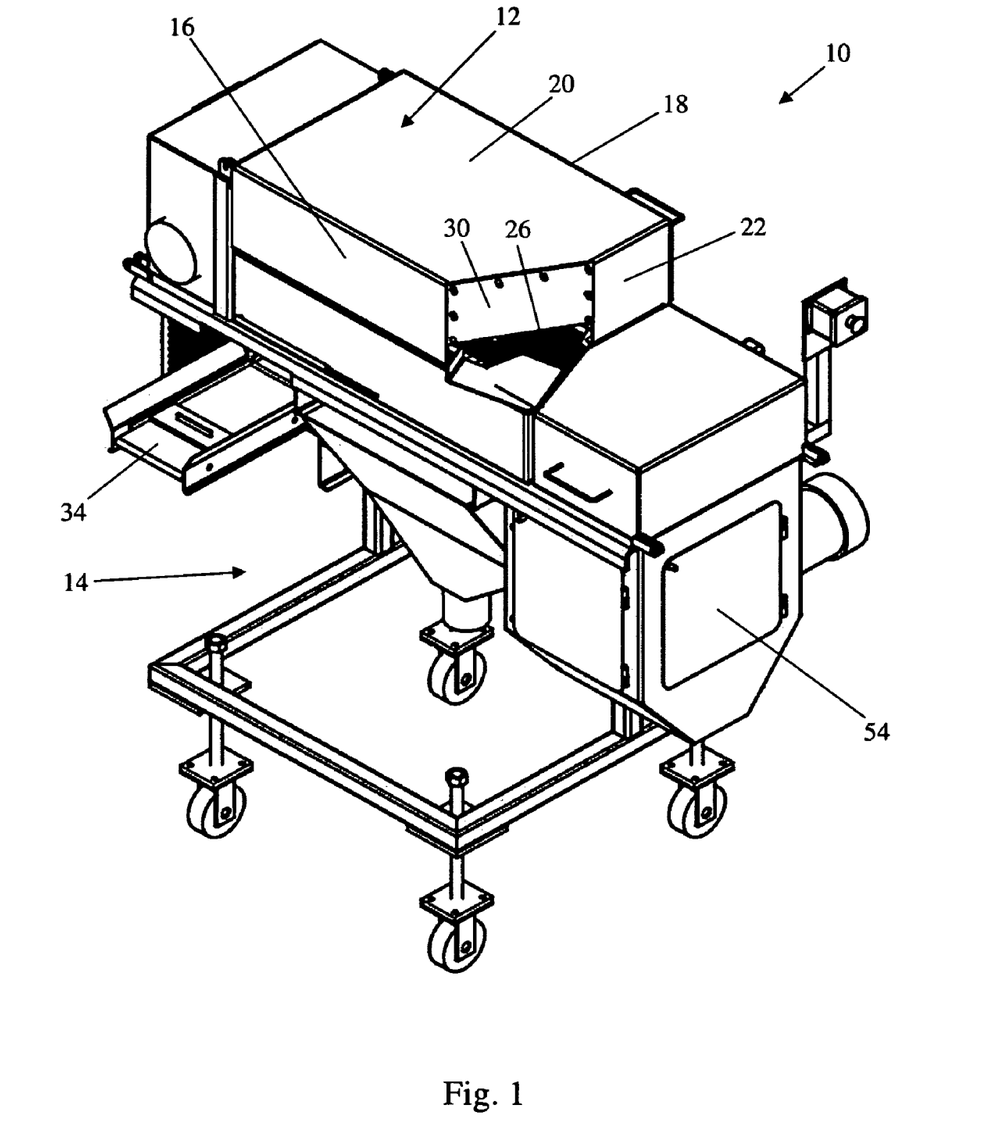
FIG. 1 is a perspective view illustrating the preferred embodiment of the present invention.
Figure 2:
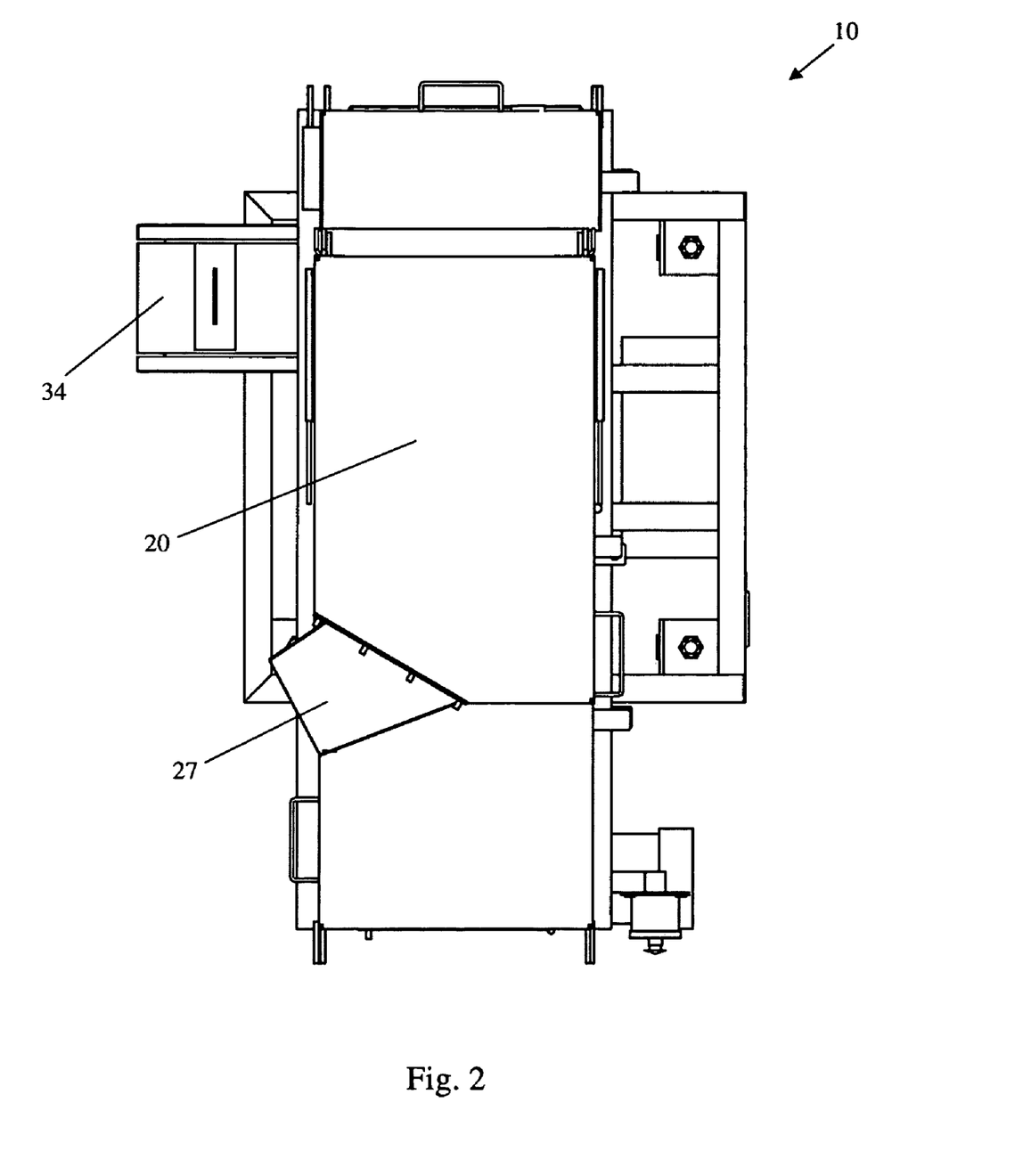
FIG. 2 is a top view illustrating the preferred embodiment of the present invention shown in FIG. 1.
Figure 3:
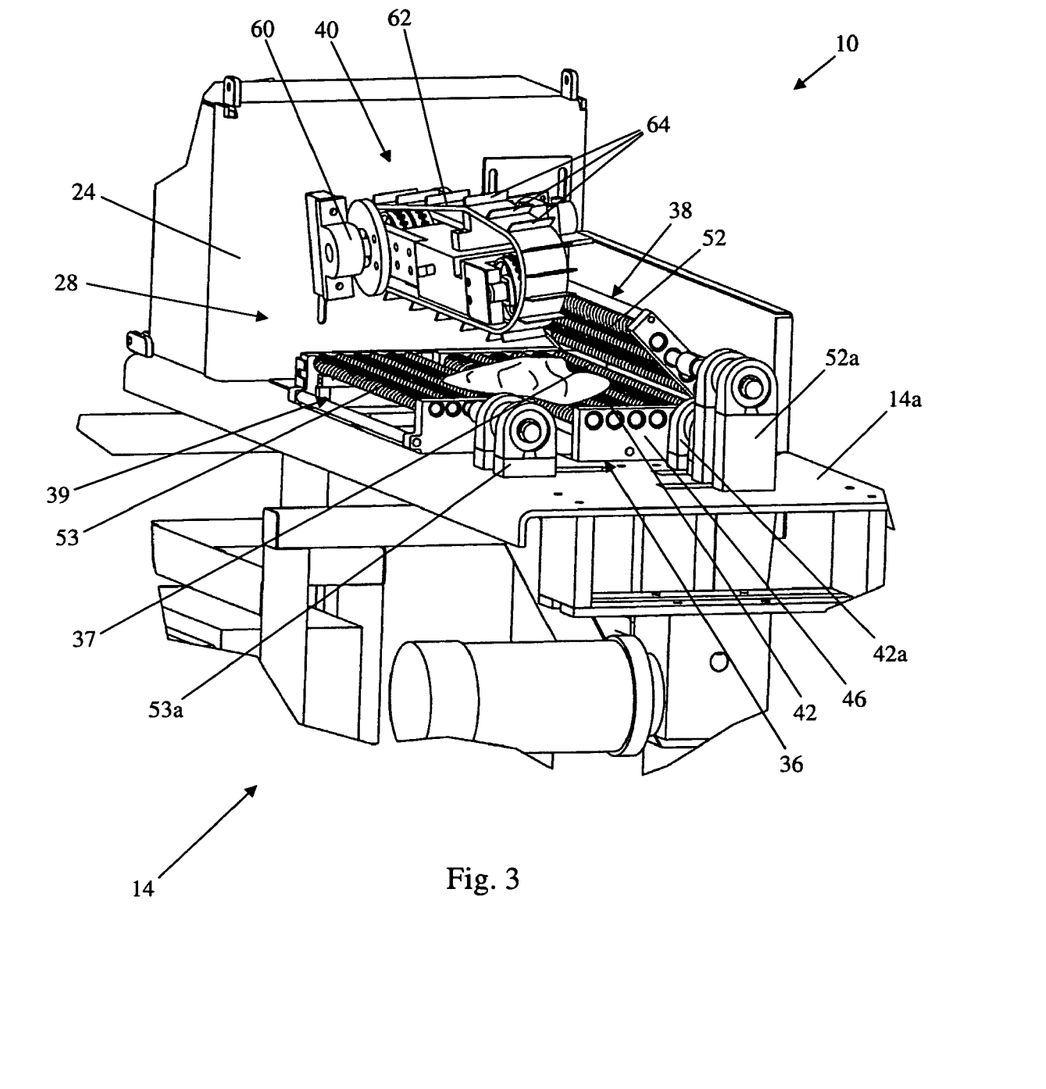
FIG. 3 is a perspective view illustrating the preferred embodiment of the present invention shown in FIG. 1 with the front, side, and top portions of the housing removed for clarity.

Referring to FIGS. 1-3, a defatting apparatus 10 in accordance with the present invention is illustrated. The apparatus is for removing fat from pieces of poultry product, and turkey breasts in particular. The apparatus 10 includes a housing, indicated generally at 12, which is mounted to a base, indicated generally at 14, for conveniently locating the apparatus and the auxiliary product and fat collection means in the most practical arrangement for a given plant production layout.

For the sake of convenience and clarity, terms such as "front," "rear," "top," "bottom," "up," "down," "inwardly," "outwardly," "lateral," and "longitudinal" will be used herein to describe the relative placement and orientation of various components of the invention, all with respect to the geometry and orientation of the defatting apparatus 10 as it appears in FIG. 1. Said terminology will include the words specifically mentioned, derivatives thereof, and words of similar import.

The housing 12 includes sidewalls 16 and 18 (sidewall 18 is not visible in FIG. 1), a top wall 20, a front wall 22, and a rear wall 24. The housing 12 is mounted to the top of the base 14 in any conventional manner well-known to those of ordinary skill in the art, such as by welding or by removable fasteners. The housing 12 has an angled, frontal opening intermediate the front wall 22 and the sidewall 16 to provide a product feed inlet 26.

As illustrated in FIG. 2, a chute 27 is employed to accept product and deliver it by gravity through the feed inlet 26 and to the defatting station, indicated generally at 28 in FIG. 3.

However, alternative means for conveying product through the feed inlet 26, such as by a conventional belt conveyor, may be employed to deliver the product to the defatting station 28 without departing from the present invention. A partial entry wall 30 is desirably included intermediate the front wall 22 and the sidewall 16 to define the upper extent of the feed inlet 26, and, in cooperation with the top wall 20, to partially enclose the defatting station 28 to reduce contact with airborne contaminants and to prevent workers from extending their hands into the defatting station 28.

Figure 4:
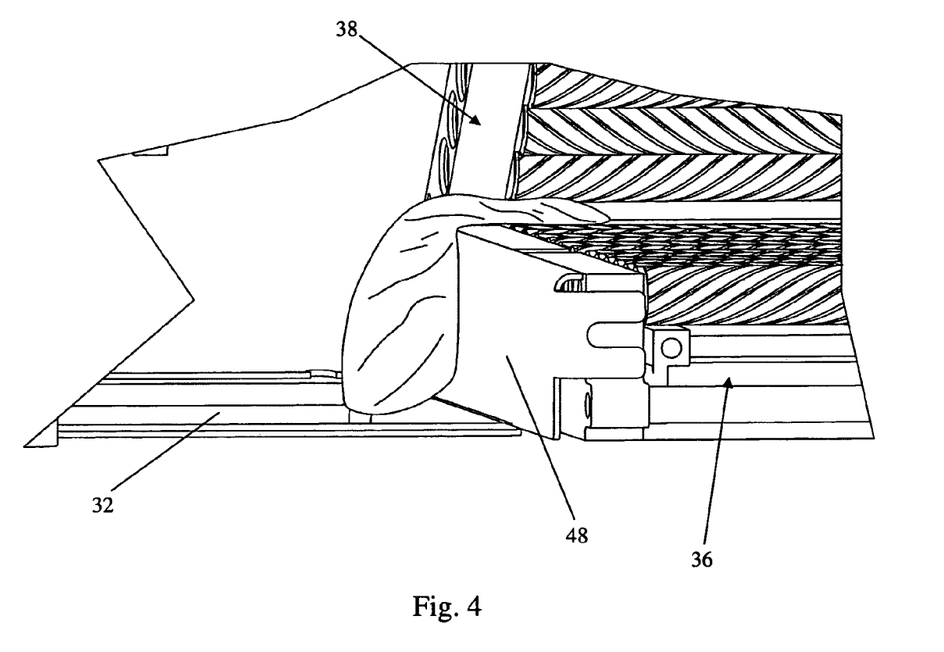
FIG. 4 is a detail view illustrating the rear discharge outlet of the preferred embodiment of the present invention shown in FIG. 1.

Referring to FIG. 4, a rear discharge outlet 32 in the base 14 allows defatted poultry product to fall by gravity to a separate collection area relative to the removed fat once the poultry product has passed through the defatting station 28. The separate collection area for the defatted product may be a conventional bin, or a conveyor 34, as shown in FIGS. 1 and 2. A central discharge outlet in the base (not within view) is located directly below the defatting station 28 for allowing removed fat to fall by gravity to a collection area such as a waste bin.

Referring to FIGS. 3 and 4, the defatting station 28 includes lower, upper, and peripheral peeling members, indicated generally at 36, 38, and 39 respectively, and an endless belt conveyor 40. The lower peeling member 36 includes four elongated, substantially cylindrical peel rollers 42 that are arranged in a parallel, close-clearance relationship on a common plane that is substantially parallel to the top plate 14a of the base 14. Each of the peel rollers 42 has a plurality of elongated, helical grooves 44 formed in its outer surface (see FIG. 5) forming a sharp land at the juncture of each adjacent pair of grooves. The rollers 42 extend longitudinally above the central discharge outlet and are rotatably mounted to front and rear brackets 46 and 48. The front and rear ends of each roller are rotatably mounted to the brackets 46 and 48, such as by mounting in conventional replaceable bearings, for allowing each roller to rotate freely about its own axis. The rollers 42 are thus mounted to the base 14 through the brackets 46 and 48.

Although the lower peeling member 36 is described and shown as having two pairs of peel rollers, it is contemplated that the peeling member 36 can incorporate only one pair, or as many or as few pairs of rollers as are deemed necessary to accommodate a particular application. While spatial limitations may dictate the overall size of the peeling member 36, and therefore the size and the quantity of the rollers 42, it has been found that rollers having a diameter in the range of about 1.25 inches to about 1.5 inches achieve the best results. However, peel rollers of any practical diameter are contemplated, as will be understood by those skilled in the art.

Gear teeth (not visible in FIGS. 3 and 4) are formed coaxially with the outer surface thereof at one end of each of the peel rollers 42 and operatively engage the gear teeth of the adjacent roller or rollers thereby forming a drive mechanism. One of the rollers, herein referred to as the "drive roller," additionally includes a coaxial drive sprocket (not shown) that extends radially from adjacent the roller's front end. The drive sprocket is preferably formed on an extension of the drive roller that extends longitudinally beyond the front bracket 46 into a bearing 42a. A chaindrive, described below, drives the drive roller 42, which drives the adjacent rollers 42, through the engaged gear teeth.

The upper and peripheral peeling members 38 and 39 are substantially identical to the lower peeling member 36. The peripheral peeling member 39 is mounted to the base plate 14a adjacent to, and is generally coplanar with, the lower peeling member 36. The upper peeling member is mounted to the base plate 14a with its plane forming an angle relative to the plane of the lower peeling member 36, thereby forming a V-shaped crotch 37 between the peeling members 36 and 38. The angle between the upper and lower members is preferably about 30 degrees for effectively accommodating most sizes of turkey breasts, although any angle in a range of about 15 degrees to about 45 degrees is contemplated. Like the lower peeling member 36, the upper and peripheral peeling members 38 and 39 include a series of peel rollers 52 and 53, respectively, having gears that are meshed with one another, including drive rollers with drive sprockets in bearings 52a and 53a, respectively. Alternatively, it is contemplated that the gear teeth of the rollers 52 and 53 engage the gear teeth of the rollers 42 so that one drive roller drives all peel rollers. It is preferred that the peel rollers 53 of the peripheral peeling member 39 have smaller diameters than the rollers 42 and 52 of the lower and upper members 36 and 38, and particularly within a range of about 0.75 inches to about 1 inch, for effectively engaging a relatively small area of the poultry product that passes through the defatting station 28, as described in greater detail below.

Figure 7:
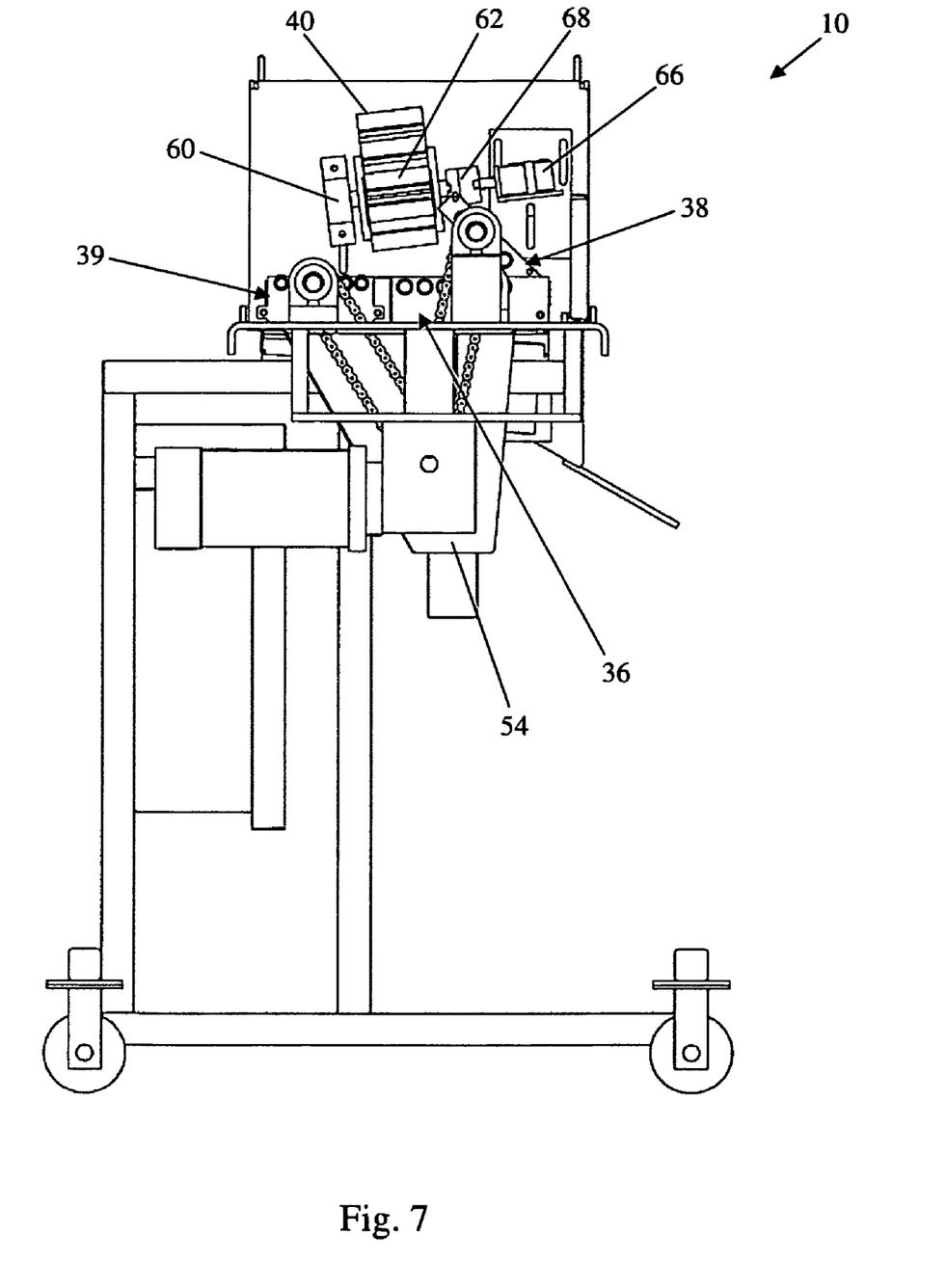
FIG. 7 is a front view illustrating the preferred embodiment of the present invention shown in FIG. 1 with the front, side, and top portions of the housing removed for clarity.

Referring now to FIGS. 1 and 7, an enclosure 54 is mounted to the underside of the base plate 14a below the front ends of the peeling members 36, 38, and 39 that houses a drive system for rotatably driving the drive sprockets of the peeling members 36, 38, and 39. The drive system can be any type of conventional drive system, such as a combination of a conventional electric motor, a conventional series of sprockets or pulleys, and drive chains or belts as described in U.S. Pat. No. 6,264,542 to Gasbarro, which is herein incorporated by reference.

When the drive system is actively rotating the drive rollers of the peeling members 36, 38, and 39 via the drive sprockets, the engagement between the gear teeth of the peel rollers 42, 52, and 53 causes the rotational movement of each drive roller to rotatably drive the adjacent rollers of the respective peeling members. For example, if one of the drive rollers is rotated in a clockwise direction, the rollers immediately adjacent the drive roller will each be driven in a counterclockwise direction. The next furthest roller or rollers from the drive roller will thus be driven in a clockwise direction. In summary, each of the peel rollers rotates in a direction opposite that of the roller or rollers immediately adjacent it and which is driven by a common drive chain or belt. This causes some pairs of adjacent rollers to have a pinching action on the upper surface thereof.

Figure 6:
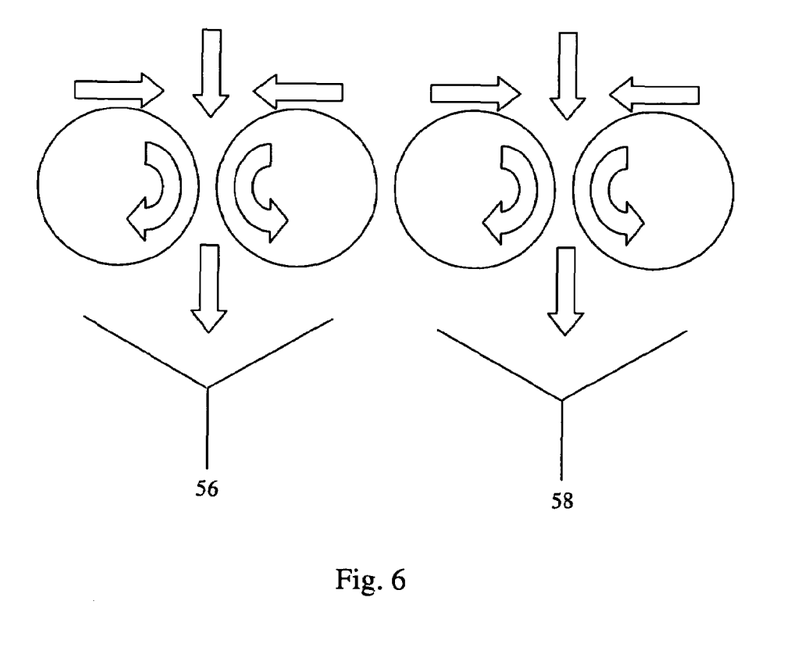
FIG. 6 is a schematic, end view illustrating the peel rollers of the lower peeling member of the preferred embodiment of the present invention shown in FIG. 1.

To further illustrate the operation of the rollers, a schematic end view of the peel rollers 42 of the lower peeling member 36 is shown in FIG. 6. The configuration of the four rollers, described above, results in two pairs of adjacent rollers 56 and 58 having surfaces that cooperatively rotate toward one another (as viewed from above, and as indicated by the horizontal arrows), and in a generally downward direction between the rollers (as viewed end-on, and as indicated by the vertical arrows) away from poultry product pieces that pass above the rollers. Each pair of rollers 56 and 58 thus forms a pinch point that, in combination with the lands on the grooved surfaces of the rollers, allows the rollers to cooperatively entrap and pull fat off the poultry product. The size of the gap between adjacent rollers is exaggerated in FIG. 6, and actually amounts to either a small gap, or only a gap where groves exist, but none where aligned lands of adjacent rollers contact each other.

After the fat is initially caught in the aligned grooves between the rollers, the longitudinally-aligned lands between the helical grooves 44 on the rollers 42 cooperatively grip the fat to provide a continuous, uninterrupted pulling force to efficiently strip the fat from the product and direct the fat between each pair of rollers 56 and 58 and away from the product. Due to the gelatinous, malleable consistency of poultry fat and the relatively weak adherence of the fat layer to the underlying meat of the poultry product, the fat can be effectively trapped in the facing grooves 44 of the rollers 42 and pulled away from the muscle of the product while the firmer, less malleable muscle is left substantially intact to pass along the rollers to the rear discharge outlet 32. The fat is thereafter allowed to fall by gravity from the rollers through the central discharge outlet and into a waste bin.

It is preferred that both the width and the depth of the helical grooves 44 are about 0.125 inches for optimal performance of the peeling members 36, 38, and 39, although all other practical dimensions are contemplated as will be understood by those skilled in the art. For example, grooves having any depth and width in a range of about 0.05 inches to about 0.25 inches are generally acceptable.

Figure 5:
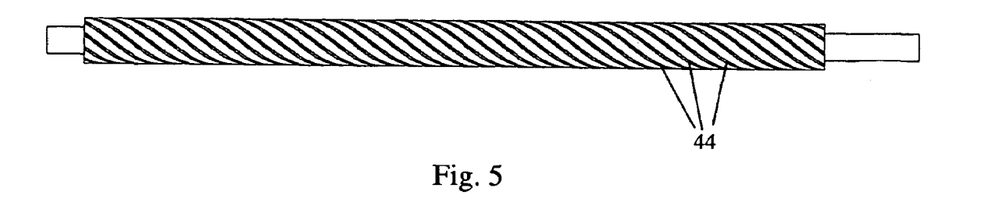
FIG. 5 is a detail view illustrating a peel roller of the preferred embodiment of the present invention shown in FIG. 1.

While it is highly preferred that the peel rollers 42, 52, and 53 of the lower, upper, and peripheral peeling members 36, 38, and 39 are formed with helical grooves 44 as shown in FIG. 5, it is contemplated that the rollers 42, 52, and 53 can alternatively incorporate any other type of surface feature that would be effective for trapping and gripping poultry fat by frictional engagement in the manner described above, such as various forms of depressions, protrusions, or textures. For example, an embodiment of the invention is contemplated wherein the peel rollers have straight, longitudinal grooves, such as on a spline shaft. Another embodiment is contemplated in which the rollers have spiked protrusions. Yet another embodiment is contemplated wherein the rollers have high-friction, abrasive surface textures.

A water spraying member (not within view) is mounted to the interior surface of the housing 12 for directing a substantially continuous supply of pressurized water to the peeling members 36, 38, and 39 and to the product. The spraying member can be any type of conventional water spraying system, such as a combination of manifolds and water supply hoses that are mounted to the housing 12 in a longitudinal series. The water provided by the spraying member cleans the product as it is being defatted and lubricates and cleans the peel rollers 42, 52, and 53.

Referring to FIGS. 3 and 7, the belt conveyor 40 is mounted on a conveyor support arm 60 which in turn is mounted to the rear wall 24. The conveyor 40 is pivotally coupled to the support arm 60 in a vertically movable relationship which allows the space defined between the lower run of the belt 62 and the top of the lower peeling member 36 to automatically adjust to, and receive, a selected range of different sizes of poultry product pieces. The lower run of the belt 62 is angled relative to the top of the lower peeling member, as best shown in FIG. 7, for maintaining a substantially constant downward and lateral pressure or force on the poultry piece for biasing the piece toward the crotch 37 formed at the intersection of the planes of the lower and upper peeling members 36 and 38, thereby keeping the lower and upper surfaces of the poultry piece in firm engagement with the peeling members 36 and 38. In addition to applying a downward and lateral force to the poultry product, the endless belt conveyor 40 functions to transport the product entering the feed inlet 26 longitudinally along the length of the peeling members 36 and 38 to the rear discharge outlet 32 by also applying a longitudinal force. The belt 62 is provided with a plurality of fins 64 for gently and effectively propelling the poultry product along the length of the rollers 42 while minimizing the risk of gouging, tearing, or piercing the meat.

A conventional electric motor 66 is mounted to the rear wall 24 adjacent the conveyor support arm 54 for driving the conveyor 40 via a drive shaft 68. The motor 66 can be fixedly or adjustably mounted to the rear wall 24 in any conventional manner that will be appreciated by those skilled in the art, such as by a bracket 64, as shown in FIG. 7. The conveyor 40 is thus supported by the conveyor support arm 60 and the drive shaft 68 and is pivotably mounted to both structures for allowing the forward end of the belt conveyor 40 to pivot freely about the axis of the drive shaft 68. A stop (not shown) in the form of a bolt or a pin is mounted to the inner side of the support arm 60 for engaging the rearmost portion of the belt conveyor 40 to function as a limit to the extent of downward pivoting of the forward end of the conveyor 40, which thus defines the predetermined separation or space between the lower run of the belt 62 and the top surface of the lower peeling member 36 when there is no product disposed therebetween.

Upon a piece of poultry product entering the feed inlet 26 and engaging the belt conveyor 40, any product that is larger than the predetermined space will cause the forward end of the conveyor 40 to pivot upwardly about the axis of the drive shaft 68. If desired, another stop can be employed in a similar fashion to the stop described above for limiting the degree of upward pivoting by the forward end of the conveyor 40 to a predetermined level.

An important feature of the present invention is the above-described relative vertical movement between at least the forward portion of the belt conveyor 40 aligned with the peeling members 36 and 38 to permit a range of sizes of poultry product to pass through the defatting station with a controlled range of angular pressure or downward force being applied to the piece of poultry for a given size range of product. In the preferred embodiment shown, the force applied to the piece of poultry engaging the peeling members 36 and 38 is set by the weight of the belt conveyor arrangement. This weight can be adjusted by controlling the initial weight of the arrangement or by adding weights to the forward end in any conventional manner in the event that more weight is deemed appropriate to accomplish the requisite level of downward force. It is important to note that too much applied force on the poultry product is undesirable, as excessive force can cause tearing or gouging of the meat portions of the product upon engagement between the conveyor 40 and the peeling members 36 and 38.

While other forms of mounting the belt conveyor 40 to apply a controlled amount of angular force and adjust automatically to different sizes of product may be employed without departing from the spirit of the present invention, the free pivoting action of the preferred embodiment is simple, inexpensive, and has been shown to work very well. However, those of ordinary skill, in view of the disclosure herein, will recognize that one could employ alternative means such as a piston and cylinder arrangement to movably adjust the distance between the lower run of the belt conveyor 40 and the peeling members 36 and 38, for example, in response to the size of the poultry piece to accomplish a similar function. Alternatively, such a pneumatic or hydraulic ram can be used to apply downward pressure on the poultry piece.

During typical operation of the defatting apparatus 10 for removing the fat from a conventional turkey breast, the breast is placed on the chute 27 and is allowed to fall by gravity through the feed inlet 26. Upon entering the defatting station 28, the upper surface of the turkey breast is engaged by the angled belt conveyor 40. Because the belt 62 tends to draw the poultry product beneath it, the belt conveyor 40 automatically raises, if necessary, to accommodate the size of the breast. The angle of the belt 62 also biases the breast toward the crotch 37 formed near the lower and upper peeling members 36 and 38. As the conveyor 40 directs the breast from the front of the defatting station 28 toward the rear discharge outlet 32, the lower, upper, and peripheral peeling members 36, 38, and 39 catch small tips of fat and strip the fat from different portions of the breast. Specifically, the lower peeling member 36 removes a generally large amount of fat located on the underside of the breast lobe; the upper peeling member 38 removes a generally moderate amount fat located on the shoulder section of the breast lobe; and the peripheral peeling member 39 removes a generally small amount of fat located on the tail end of the breast lobe. The water provided by the water sprayer washes residual pieces of fat off the product and the peel rollers 36, 38, and 39. All of the removed fat falls by gravity through the central discharge outlet and is collected in a waste bin below.

After the defatted turkey breast reaches the rear end of the peeling members 36 and 38, the breast falls by gravity off the lower peeling member 36 and through the rear discharge outlet 32. The breast then falls a short distance to the conveyor 34, which directs the breast into a separate product collection bin where the breast can be collected for further processing.

Although the upper and peripheral peeling members 38 and 39 are included in the preferred embodiment of the invention, it is contemplated that one or both of the upper and peripheral members 38 and 39 can be omitted. If the upper member 38 is omitted, the belt conveyor 40 can be mounted to the rear wall 24 with the lower run of the belt 62 in a parallel orientation with the top of the lower peeling member 36 for providing only a downwardly directed force or pressure on the poultry product. Alternatively, it is contemplated that a sidewall or other barrier can be substituted for the upper peeling member 38, in which case the conveyor 40 can be mounted at an angle, as in the preferred embodiment, for directing the product into a crotch formed between the lower peeling member 36 and the sidewall.

If the peripheral peeling member 39 is omitted, it is contemplated that the width of lower peeling member 36 may be increased by incorporating additional pairs of lower peel rollers for removing fat from the tail end of a turkey breast lobe.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An automated poultry product defatting apparatus comprising, in combination:
   a) a housing mounted to a base and provided with a product feed inlet and a product discharge outlet;
   b) discharge outlet and having at least one pair of substantially circular, cylindrical lower peel rollers, each lower peel roller aligned in a substantially parallel orientation and in a close-clearance relationship to the adjacent lower peel rollers, the lower peel rollers rotating in a cooperative manner to pinch external fat on the lower side of a piece of poultry product placed thereon between the lower peel rollers and pull the fat off the product; and
   c) a conveyor mounted to said housing and aligned to engage an upper surface of the piece of poultry product delivered to the feed inlet and direct the product in a path along, and in firm engagement with, the lower peeling member toward the discharge opening, the conveyor being mounted for selected movement of at least a first end of the conveyor in response to the size of the piece of poultry product; and
   d) an upper peeling member mounted to the base above and at an angle relative to the lower peeling member to form a crotch near the juncture of the peeling members, the upper peeling member having at least one pair of substantially circular, cylindrical upper peel rollers, each upper peel roller aligned in a substantially parallel orientation and in a close-clearance relationship to the adjacent upper peel rollers, the upper peel rollers rotating in a cooperative manner to pinch external fat on the upper side of the piece of poultry product and to pull the fat off the poultry product, a lower run of the conveyor being angled to direct the poultry product toward the crotch and to maintain firm engagement between the upper surface of the product and the upper peeling member.

2. The automated poultry product defatting apparatus in accordance with claim 1, wherein each of the lower peel rollers has a plurality of grooves formed in its outer surface.

3. The automated poultry product defatting apparatus in accordance with claim 2, wherein the grooves are helical in shape.

4. The automated poultry product defatting apparatus in accordance with claim 1, wherein each of the upper peel rollers has a plurality of grooves formed in its outer surface.

5. The automated poultry product defatting apparatus in accordance with claim 4, wherein the grooves are helical in shape.

6. An automated poultry product defatting apparatus comprising, in combination:
   a) a housing mounted to a base and provided with a product feed inlet and a product discharge outlet;
   b) a lower peeling member mounted to the base intermediate the feed inlet and the discharge outlet and having at least one pair of substantially circular, cylindrical lower peel rollers, each lower peel roller aligned in a substantially parallel orientation and in a close-clearance relationship to the adjacent lower peel rollers, the lower peel rollers rotating in a cooperative manner to pinch external fat on the lower side of a piece of poultry product placed thereon between the lower peel rollers and pull the fat off the product; and
   c) a conveyor mounted to said housing and aligned to engage an upper surface of the piece of poultry product delivered to the feed inlet and direct the product in a path along, and in firm engagement with, the lower peeling member toward the discharge opening, the conveyor being mounted for selected movement of at least a first end of the conveyor in response to the size of the piece of poultry product; and
   d) a peripheral peeling member mounted to the base adjacent the lower peeling member and having at least one pair of peripheral peel rollers, each peripheral peel roller aligned in a substantially parallel orientation and in a close-clearance relationship to the adjacent peripheral peel rollers, the peripheral peel rollers rotating in a cooperative manner to pinch external fat on an end of the piece of poultry product between the peripheral peel rollers and to pull the fat off the poultry product.

7. The automated poultry product defatting apparatus in accordance with claim 6, wherein each of the peripheral peel rollers has a plurality of grooves formed in its outer surface.

8. The automated poultry product defatting apparatus in accordance with claim 7, wherein the grooves are helical in shape.

9. An automated poultry product defatting apparatus comprising, in combination:
   a) a housing mounted to a base and provided with a frontal opening defining a product feed inlet and a rear opening defining a product discharge outlet;
   b) a lower peeling member mounted to the housing intermediate the feed inlet and the discharge outlet and having at least one pair of substantially circular, cylindrical lower peel rollers, each lower peel roller aligned in a substantially parallel orientation and in a close-clearance relationship to the adjacent lower peel rollers, the lower peel rollers rotating in a cooperative manner to pinch external fat on the lower side of a piece of poultry product between the lower peel rollers and to pull the fat off the poultry product;
   c) an upper peeling member mounted to the housing above and at an angle relative to the lower peeling member to form a crotch near the juncture of the upper and lower peeling members, the upper peeling members having at least one pair of substantially circular, cylindrical upper peel rollers, each upper peel roller aligned in a substantially parallel orientation and in a close-clearance relationship to the adjacent upper peel rollers, the upper peel rollers rotating in a cooperative manner to pinch external fat on the upper side of the piece of poultry product between the rollers and to pull the fat off the poultry product; and
   d) a conveyor mounted to said housing and aligned to engage an upper surface of the piece of poultry product delivered to the feed inlet and direct the product toward the discharge outlet and the crotch to maintain firm engagement with the upper and lower peeling members, the conveyor being mounted to the housing for selected movement of at least a forward end of the conveyor in response to the size of the piece of poultry product delivered to said feed inlet.

10. The automated poultry product defatting apparatus in accordance with claim 9, wherein each of the upper and lower peel rollers has a plurality of grooves formed in its outer surface.

11. The automated poultry product defatting apparatus in accordance with claim 10, wherein the grooves are helical in shape.

12. A method of removing external fat from a piece of poultry product comprising, in combination:
   a) introducing a piece of poultry product to a feed inlet defined between a moving conveyor spaced above a lower peeling member and adjacent an upper peeling member, each of the peeling members provided with at least one pair of peel rollers;
   b) engaging a portion of an upper surface of the poultry product with said moving conveyor to propel the poultry product along a selected path from said feed inlet toward a discharge outlet and to maintain firm engagement between the poultry product and the peeling members; and
   c) rotating the peel rollers in a cooperative manner to pinch fat on the product and pull the fat between the rollers and off the product while leaving the rest of the poultry product substantially intact as the poultry product moves toward the discharge outlet, and directing the removed fat to a collection area.

13. The method in accordance with claim 12, further comprising causing a forward end of the conveyor to pivot relative to the peeling members by engagement of a piece of poultry product with the forward end while maintaining a force upon a piece of poultry product disposed between the conveyor and the peeling members, said generally constant force exerted by the weight of said forward end of said conveyor.

* * * * *